(12) United States Patent
Lee et al.

(10) Patent No.: US 9,071,933 B2
(45) Date of Patent: *Jun. 30, 2015

(54) METHOD AND APPARATUS FOR PERFORMING A CHANNEL AVAILABILITY QUERY FOR A PLURALITY OF LOCATIONS

(75) Inventors: Jihyun Lee, Gyeonggi-do (KR); Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/701,647

(22) PCT Filed: Oct. 20, 2011

(86) PCT No.: PCT/KR2011/007829
§ 371 (c)(1),
(2), (4) Date: Dec. 3, 2012

(87) PCT Pub. No.: WO2012/124872
PCT Pub. Date: Sep. 20, 2012

(65) Prior Publication Data
US 2013/0072232 A1    Mar. 21, 2013

Related U.S. Application Data

(60) Provisional application No. 61/453,558, filed on Mar. 17, 2011.

(51) Int. Cl.
*H04W 24/00* (2009.01)
*H04W 4/02* (2009.01)
(Continued)

(52) U.S. Cl.
CPC ............. *H04W 4/023* (2013.01); *H04W 48/14* (2013.01); *H04W 72/00* (2013.01); *H04W 84/12* (2013.01)

(58) Field of Classification Search
CPC .... H04W 72/08; H04W 72/14; H04W 74/008
USPC .......... 455/456.3, 456.2, 515, 434, 509, 451, 455/452.1; 370/329, 442
See application file for complete search history.

(56) References Cited

U.S. PATENT DOCUMENTS

2007/0011335 A1*  1/2007  Burns et al. .................. 709/227
2009/0010399 A1   1/2009  Kim et al.
(Continued)

FOREIGN PATENT DOCUMENTS

CN      101779417 A    7/2010
JP      2010-532619 A  10/2010
(Continued)

OTHER PUBLICATIONS

Alemseged et al., "Enhanced Channel Availability Query to support database query for multiple locations," IEEE 802.11af-11/0259r1, Mar. 12, 2011.
(Continued)

*Primary Examiner* — Khalid Shaheed
(74) *Attorney, Agent, or Firm* — Morgan, Lewis & Bockius LLP

(57) ABSTRACT

The present invention relates to a method and apparatus for channel availability query on multiple locations in a wireless local area network system. A method for a station (STA) to perform a channel query procedure in a wireless communication system comprises: transmitting, at a first STA corresponding to a channel availability query requesting STA, a first message to a second STA supporting the channel availability query procedure, wherein the second STA corresponds to a channel availability query responding STA, wherein the first message comprises device location information of one or more locations for the channel availability query; and receiving, at the first STA from the second STA, a second message comprising channel availability information, wherein the channel availability information is commonly applicable to multiple locations within an area, when the device location information of the first message is for the multiple location within the area.

14 Claims, 9 Drawing Sheets

(51) Int. Cl.
  *H04W 48/14* (2009.01)
  *H04W 72/00* (2009.01)
  *H04W 84/12* (2009.01)

(56) References Cited

U.S. PATENT DOCUMENTS

| | | | |
|---|---|---|---|
| 2010/0261423 A1* | 10/2010 | Stanforth et al. | 455/3.01 |
| 2011/0019104 A1 | 1/2011 | Kwak et al. | |
| 2011/0087639 A1* | 4/2011 | Gurney | 707/690 |
| 2011/0164580 A1* | 7/2011 | Keon | 370/329 |
| 2011/0237179 A1 | 9/2011 | Sagae et al. | |
| 2012/0184318 A1* | 7/2012 | Lee et al. | 455/515 |
| 2013/0237237 A1* | 9/2013 | Rahman et al. | 455/452.1 |

FOREIGN PATENT DOCUMENTS

| | | | |
|---|---|---|---|
| WO | 2010/026858 A1 | 3/2010 | |
| WO | 2010/117998 A1 | 10/2010 | |

OTHER PUBLICATIONS

Written Opinion and Search Report issued in corresponding International Patent Application No. PCT/KR2011/007829 dated Apr. 20, 2012 (partial translation).

Alemseged et al., "Enhanced Channel Availability Query to support database query for multiple locations," IEEE P802.11Wireless LANs, IEEE 802.11af-11/025911 (Mar. 12, 2011).

Kafle et al., "Simplification of Enablement Procedure for TVWS band," IEEE P802.11 Wireless LANs, IEEE802.11-10/0352r2 (Mar. 11, 2011).

Lee et al., "Normative Text for Fixed TVBD identifying information," IEEE P802.11 Wireless LANs, IEEE 802.11-11/0403r0 (Mar. 15, 2011).

Lee et al., "Identification Signal for Fixed devices," IEEE P802.11 Wireless LANs, IEEE 802.11-11/0402r1 (Mar. 16, 2011).

Office Action dated Nov. 26, 2014, issued by the State Intellectual Property Office of China in Chinese Patent Application No. 201180033458.1.

Search Report dated Jan. 29, 2015, issued by the European Patent Office in European Patent Application No. 11861170.6.

Alemseged et al. "Normative text to resolve comments related to multiple locations channel availability query," IEEE 802.11-11/0664r6, May 2011.

* cited by examiner

FIG. 1

| element ID | length | country code | channel map |
|---|---|---|---|
| 1 | 1 | 3 | N | octet :

FIG. 2

| | device type | channel number N | maximum transmit power level on channel N | ...... | channel number K | maximum transmit power level on channel K | registered location | whitespace band range |
|---|---|---|---|---|---|---|---|---|
| octet : | 1 | 1 | 1 | | 1 | 1 | variable | variable |

FIG. 10

| category | public action | request STA address | response STA address | cause effect code | length |
|---|---|---|---|---|---|
| octet: 1 | 1 | 6 | 6 | 1 | 1 | device location information is repeated

| channel query information | device class | device identification information | device location information | device location information |
|---|---|---|---|---|
| octet: 1 | variable | variable | variable | variable |

FIG. 11

| B0 | B1 | B2 - B5 | B6 - B7 |
|---|---|---|---|
| device identification information present | device location information present | quantity of device location information | reserved |
| bit: 1 | 1 | 5 | 2 |

FIG. 12

| | B0 - B5 | B6 - B30 | B31 - B39 | B40 - B45 | B46 - B70 | B71 - B79 | B80 - 12 |
|---|---|---|---|---|---|---|---|
| | latitude resolution | latitude prime number part | latitude integer par | longitude resolution | longitude prime number part | longitude integer par | altitude type |
| bit: | 6 | 25 | 9 | 6 | 25 | 9 | 4 |

| | B84 - B89 | B90 - B97 | B98 - B119 | B120 - B122 | B123 - B127 | B128 - B159 |
|---|---|---|---|---|---|---|
| | altitude resolution | altitude prime number part | altitude integer par | datum | Vicinity present | Vicinity information |
| bit : | 6 | 8 | 22 | 3 | 5 | 32 |

FIG. 13

| | B0 - B5 | B6 - B30 | B31 - B39 | B40 - B45 | B46 - B70 | B71 - B79 | B80- B119 |
|---|---|---|---|---|---|---|---|
| | latitude resolution | latitude prime number part | latitude integer par | longitude resolution | longitude prime number part | longitude integer par | Vicinity information |
| bit: | 6 | 25 | 9 | 6 | 25 | 9 | 36 |

| | B120 - B122 | B123 - B127 |
|---|---|---|
| | datum | reserved |
| bit : | 3 | 5 |

METHOD AND APPARATUS FOR PERFORMING A CHANNEL AVAILABILITY QUERY FOR A PLURALITY OF LOCATIONS

This is a U.S. National Phase Entry of PCT Application No. PCT/KR2011/007829, filed Oct. 20, 2011, and claims the benefit of U.S. Provisional Application No. 61/453,558 filed Mar. 17, 2011.

BACKGROUND OF THE INVENTION

1. Field of the Invention

The present invention relates to a method and apparatus for channel availability query on multiple locations in a wireless local area network (WLAN).

2. Discussion of the Related Art

Standards for wireless local area network (WLAN) technologies have been developed as IEEE 802.11 standards. IEEE 802.11a provides a transmission rate of 54 Mbps and IEEE 802.11b provides a transmission rate of 11 Mbps using an unlicensed band at 2.4 GHz or 5 GHz. IEEE 802.11g provides a transmission rate of 54 Mbps using orthogonal frequency-division multiplexing (OFDM) at 2.4 GHz. IEEE 802.11n provides a transmission rate of 300 Mbps for 4 spatial streams using Multiple Input Multiple Output OFDM (MIMO-OFDM). IEEE 802.11n supports channel bandwidths of up to 40 MHz and, in this case, provides a transmission rate of 600 Mbps.

IEEE 802.11af standards for regulating WLAN operation of an unlicensed device in a TV whitespace zone is under development.

TV whitespace includes VHF bands (54 to 60 MHz, 76 to 88 MHz, and 174 to 216 MHz) and UHF bands (470 to 698 MHz) which are assigned to broadcast TV. The TV whitespace means a frequency band allowed to be used by an unlicensed device on the condition that the unlicensed device does not disturb communication of licensed devices (TV broadcast, wireless microphone, etc.) operating in the frequency band.

While all unlicensed devices are permitted to operate in frequency bands of 512 to 608 MHz and 614 to 698 MHz except some special cases, frequency bands of 54 to 60 MHz, 76 to 88 MHz, 174 to 216 MHz and 470 to 512 MHz are allowed only for communication between fixed devices. A fixed device means a device that transmits signals only at a fixed location. In the following description, a whitespace band includes the aforementioned TV whitespace. However, the whitespace is not limited thereto.

An unlicensed device that wants to use a whitespace band needs to provide a protection function for licensed devices. Accordingly, the unlicensed device must check whether the licensed devices occupy the whitespace band before starting transmission in the whitespace band.

To achieve this, the unlicensed device needs to access a geo-location database through the Internet or a dedicated network to acquire information on a list of channels available in the corresponding area. The geo-location database stores and manages information on licensed devices registered therein and channel usage information that is dynamically changed according to geo-locations and used time of the licensed devices.

A station (STA) can execute a spectrum sensing mechanism. An energy detection scheme, a feature detection scheme, etc. can be used as the spectrum sensing mechanism. For example, it is possible to determine that a channel is being used by a licensed device or an incumbent user when the intensity of a received signal exceeds a predetermined value or a DTV preamble is detected. When it is determined that a channel adjacent to a currently used channel is used by an incumbent user, an STA and an AP need to decrease transmit power.

SUMMARY OF THE INVENTION

As described above, an STA needs to acquire information on available channels in a whitespace band to operate in the whitespace band. The present invention proposes a method and apparatus for an STA that wants to perform a WLAN operation in a white space band to efficiently execute a channel availability query. Particularly, the present invention provides a method for performing a channel availability query on multiple locations rather than updating available channel information when an STA moves, and a signal format therefor.

According to an aspect of the present invention, a method for a station (STA) to perform a channel availability query procedure in a wireless communication system includes: transmitting, at a first STA corresponding to a channel availability query requesting STA, a first message to a second STA supporting the channel availability query procedure, wherein the second STA corresponds to a channel availability query responding STA, wherein the first message comprises device location information of one or more locations for the channel availability query; and receiving, at the first STA from the second STA, a second message comprising channel availability information, wherein the channel availability information is commonly applicable to multiple locations within an area, when the device location information of the first message is for the multiple location within the area.

The channel availability information may be obtained from a registered location server, and the second STA may be a registered location server.

The device location information may include geo-location position information with at least latitude, longitude and radius information, and the radius information may indicate a radius in a horizontal plane from a point designated by the latitude and longitude information.

The first message may further include information indicating a number of the device location information.

The device location information about the one or more locations may be of one or both of first and second types, the first type may be defined on the basis of geo-location position information with at least latitude, longitude and radius information, and the second type may be defined on the basis of a plurality of device location information.

The channel availability information may be applicable to a first location among the multiple locations, when there is no channel availability information commonly applicable to the multiple locations and the device location information of the first message is for the multiple locations within the area.

The channel availability query procedure may be performed by using a generic advertisement service (GAS) protocol, and the first STA and the second STA may employ a registered location query protocol (RLQP).

In this case, the first message may further include a reason result code indicating the first message is for a channel availability query request and STA identity information for the addresses of the channel availability query requesting STA and the channel availability query responding STA.

The second message may further include a reason result code indicating a first value or a second value, wherein the first value indicates the channel availability information is commonly applicable to the multiple locations within the area, and the second value indicates the channel availability information is for a first location among the multiple locations.

According another aspect of the present invention, a station device operable as a first station (STA) of a channel query procedure in a wireless communication system includes: a transceiver supporting the channel query procedure, and configured to transmit a first message comprising device location information of one or more locations for channel availability query to a second STA supporting the channel query procedure and corresponding to a channel availability responding STA of the channel query procedure, and to receive a second message including channel availability information from the second STA; and a processor connected to the transceiver and configured to control the transceiver to operate the first STA as a channel availability query requesting STA of the channel query procedure, wherein when the device location information is commonly applicable to multiple locations within an area, when the device location information of the first message is for the multiple locations within the area.

According another aspect of the present invention, a method for a station (STA) to perform a channel query procedure in a wireless communication system includes: receiving, from a first STA corresponding to a channel availability query requesting STA, a first message at a second STA supporting the channel query procedure, wherein the second STA corresponds to a channel availability query responding STA, wherein the first message comprises device location information of one or more locations for the channel availability query; and transmitting, to the first STA by the second STA, a second message comprising channel availability information, wherein the channel availability information is commonly applicable to multiple locations within an area, when the device location information of the first message is for the multiple locations within the area.

According another aspect of the present invention, a station device operable as a second station (STA) of a channel query procedure in a wireless communication system includes: a transceiver configured to receive a first message comprising device location information of one or more locations for a channel availability query from a first STA corresponding to a channel availability query requesting STA of the channel query procedure, and to transmit a second message comprising channel availability information to the first STA; and a processor connected to the transceiver and configured to control the station device to support the channel query procedure and operate as a channel availability query responding STA of the channel query procedure, wherein the channel availability information is commonly applicable to multiple locations within an area, when the device location information of the first message is for the multiple locations within the area.

Advantageous Effects

According to the above-mentioned embodiments of the present invention, an STA that wants to perform a WLAN operation in a whitespace band can efficiently perform a channel availability query procedure. Particularly, even when the STA moves, the STA can perform a channel availability query on multiple locations rather than updating available channel information when it moves.

BRIEF DESCRIPTION OF THE DRAWINGS

FIG. 1 illustrates an exemplary WSM information element;
FIG. 2 illustrates a channel map field included in the WSM shown in FIG. 1;
FIG. 10 shows a channel availability query frame format according to an exemplary embodiment of the present invention;
FIG. 11 shows a channel query information field format according to an exemplary embodiment of the present invention;
FIG. 12 shows exemplary device location information according to an exemplary embodiment of the present invention;
FIG. 13 shows device location information about a personal/portable device.

DETAILED DESCRIPTION OF THE INVENTION

Figure 3:
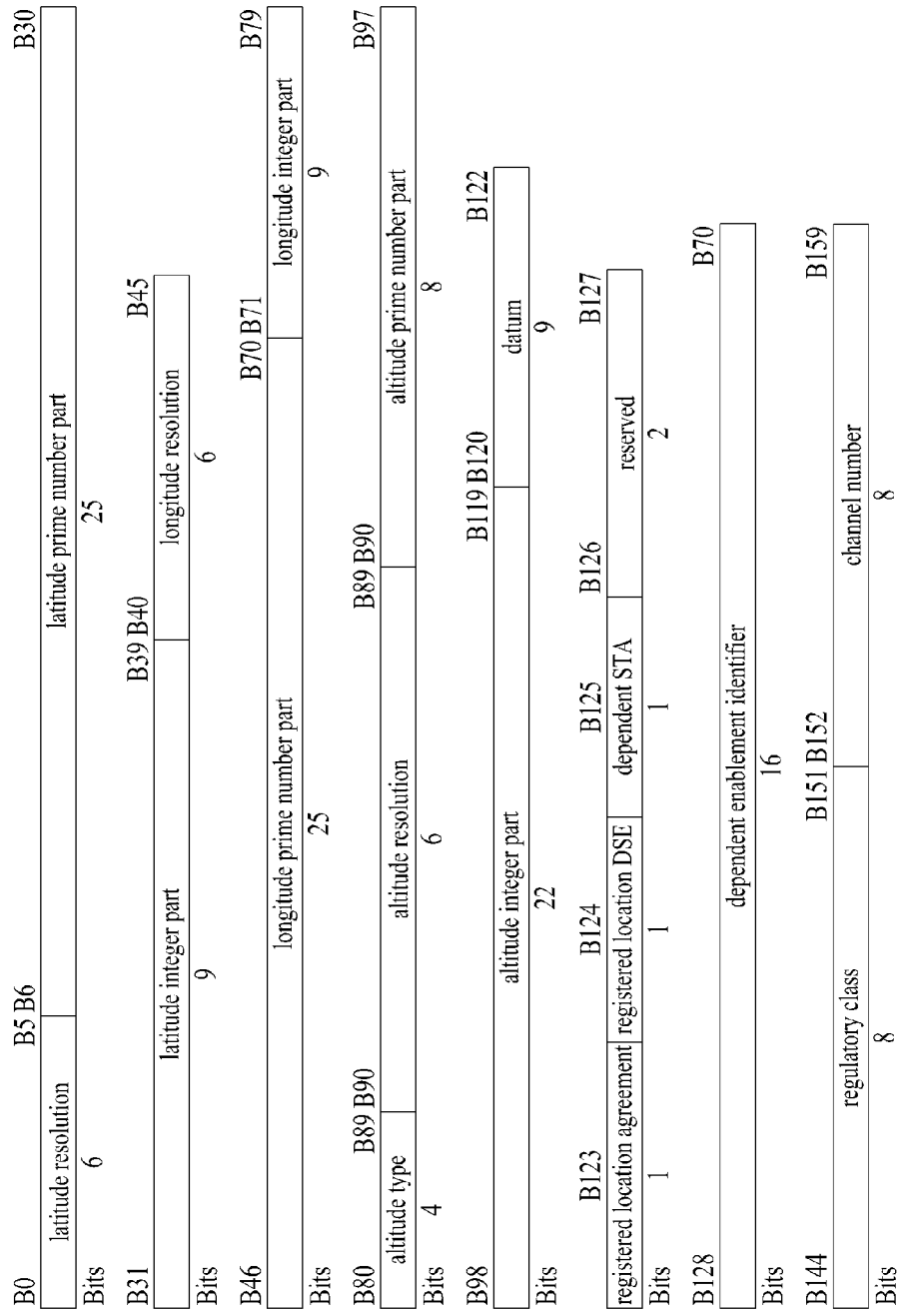
FIG. 3 illustrates an exemplary registered location field for describing the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

As described above, an STA that wants to operate in a whitespace band needs to acquire information on an available channel in the whitespace band. The information on an available channel may have a WSM (White Space Map) format.

FIG. 1 illustrates an exemplary WSM information element.

A WSM information element is used for a specific STA (e.g., an enabling STA or a dependent AP that enables a dependent STA) to signal a channel available for transmission to other STAs (e.g., dependent STAs). The WSM information element can be transmitted being included in a management action frame such as a beacon frame, a probe response frame, a WSM announcement frame, etc.

A WSM in a TV whitespace band includes information indicating whether a TV signal occupies a channel. The WSM can indicate the numbers of channels available for unlicensed devices at a specific time and maximum allowable power values in the available channels in the form of a list.

An enabling STA can transmit a WSM to a dependent STA. A dependent AP enabled by the enabling STA transmits a WSM to a dependent STA. The WSM can be used to efficiently support scanning procedures of dependent STAs operable in a whitespace band, as described above. That is, the dependent STA can scan only a specified WLAN channel only in an available channel designated by the received WSM.

In the WSM information element shown in FIG. 1, a country code field provides information on the location of a channel map following this field. With respect to TV whitespace, countries may have different TV bands and TV channel bandwidths, and different regulatory domains are assigned to the countries. Accordingly, the country code field helps recognize the physical location of a TV channel available for an STA that receives the WSM along with a channel map field.

The country code field can be signaled as a country string value of 3 octets. That is, the first 2 octets may indicate a country code defined in ISO/IEC 3166-1 and the last octet may mean an environment. The country code field can include more detailed information than country information in an extensive manner. For example, the country code field can include a regional code value of a specific country.

Although the basic unit of a channel map that signals whether or not a channel is available is not limited to a TV channel bandwidth, the basic unit can be channel information in the smallest basic unit provided by a database of a corresponding regulatory domain.

The channel map field includes an available channel number (e.g., TV channel number) and a maximum transmit power level corresponding to each available channel (TV channel) according to FCC regulations. FIG. 2 illustrates the channel map field of the WSM information element shown in FIG. 1.

As shown in FIG. 2, the channel map field of the WSM can include a device type field. An enabling STA or a dependent AP that transmits channel map information preferably signals a device type corresponding to a device to be provided with a service from the enabling STA or dependent AP along with a channel map when transmitting the channel map because an available channel and a maximum allowable transmit power level may depend on device type. For example, a fixed device cannot use a channel adjacent to a TV channel being used by an incumbent user. Conversely, a personal/portable device can use a channel next to a TV channel being used by an incumbent user on the condition that a maximum allowable power level in the channel is reduced from 100 mW to 40 mW.

Therefore, the channel map preferably includes the device type field with an available channel number (e.g. TV channel number) and a maximum transmit power level corresponding to each available channel according to FCC regulations. The device type field signals the type of a device, which is provided with the service from the enabling STA or dependent AP and can use the WSM, rather than signaling the type of a device that transmits the WSM.

Specifically, the device type field can signal a spectrum mask value of an STA that can use the WSM with information on a fixed device and a personal/portable device.

A fixed device may not be allowed to use a WSM having a device type corresponding to a personal/portable device. This is because a channel unavailable for the fixed device may be signaled as an available channel when the device type field of the WSM is set to a personal/portable device.

The channel map shown in FIG. 2 includes a registered location field. The registered location field is geo-location information represented as a three-dimensional coordinate (latitude, longitude, altitude). The registered location field may include latitude, longitude and altitude values and their resolutions. The registered location field may further include information indicating whether the corresponding location information corresponds to an enabling STA or a dependent STA.

FIG. 3 illustrates an exemplary registered location field.

The format shown in FIG. 3 is based on the DSE registered location element body field defined in IEEE 802.11y standard. A dependent enablement identifier, a regulatory class, and a channel number included in the registered location field can be set to reserved values.

The above-mentioned WSM information element can signal an available channel list at a specific location indicated by the location information in the format as shown in FIG. 3. However, if an STA that has received the WSM moves from the location by a predetermined range or more, the STA needs to receive the WSM again and make a channel availability query again to receive the WSM. To solve this problem, according to an aspect of the present invention, there is provided a method of querying available channel information of multiple locations and receiving a WSM according to the available channel information query.

For example, an enabling STA can acquire information about channels available in not only the location thereof but also multiple locations around the location. The enabling STA can combine available channel information acquired in this manner to set a geographical area having the same available channel. This geographical area has a boundary defined as a specific cooperate set. Even when an STA moves in the geographical area, the available channel is valid so long as the STA is within the boundary, and thus it is not necessary to update the available channel. A geographical area based on a plurality of locations (points) will be referred to as a whitespace zone hereinafter.

A dependent STA can start to operate by receiving an enable signal from an enabling STA. At this time, it is possible to consider a case in which a plurality of dependent STAs enabled by a specific enabling STA is located in a specific geographical range.

Figure 4:
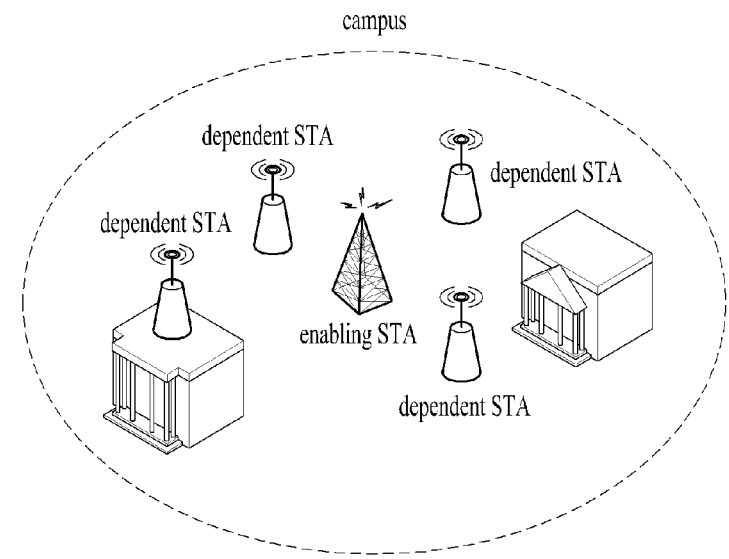
FIG. 4 illustrates a campus environment for describing an exemplary embodiment of the present invention.

FIG. 4 illustrates a campus environment for describing an exemplary embodiment of the present invention.

Referring to FIG. 4, an enabling STA is present and a plurality of dependent STAs enabled by the enabling STAs is distributed in the campus. The dependent STAs can move to different buildings, different lecture rooms, and different floors in the campus. In a regionally divided service environment, such as the campus or an office/apartment, it is more efficient to use common channel information available in the divided regions. Particularly, it is expected that the common available channel information is useful in a rural area because an available channel is hardly changed according to location in the rural area.

The whitespace zone range can be represented in various forms. For example, the whitespace zone can be represented as an area within a predetermined radius with the geo-location coordinate point of a registered location as the center. Although the whitespace zone can have any form, the physical location of the whitespace zone needs to be calculated in association with registered location information.

For example, a location can be registered as a three-dimensional coordinate of (x1, y1, z1) and a whitespace range can be set as a radius value. In this case, a spherical whitespace zone having a radius with (x1, y1, z1) as the center of the sphere can be set.

When an altitude value of registered location information about a personal/portable device is omitted, a whitespace zone can be specified as an area within a predetermined radius from a point designated by latitude and longitude values of the registered location information in a plane.

As described above, a common available channel can be used in a specific zone in a campus/rural area. However, the common available channel is not limited to the campus or rural area, and it is possible to calculate and use a common channel valid for all STAs located in one whitespace zone as necessary.

A method of operating a WSM according to an exemplary embodiment of the present invention will now be described with reference to FIG. 4.

In FIG. 4, the dependent STAs located in the specific range start to operate by being enabled by the enabling STA. Here, the enabling STA transmits an enable signal and a WSM. The WSM may have the format shown in FIG. 1 and available channel information may have the channel map shown in FIG. 2. The dependent STAs receiving the WSM from the enabling STA can communicate on the basis of an available TV channel number and a maximum transmit power level signaled through the channel map.

The enabling STA according to the current embodiment acquires a channel commonly available in a whitespace zone range, set by the enabling STA, through information on channels available in multiple locations and transmits information on the common available channel. This can be achieved by performing an AND operation on sets of channels available in multiple locations to calculate the intersection of the channel sets.

While no restriction is imposed on a method used for procedures of deriving optimized location information and available channel information required for the calculation, a common available channel, finally computed in a location selected from a whitespace zone range, needs to be applied to the method.

The enabling STA can set a whitespace zone first, and then select multiple locations that can cover the whitespace zone by computing them. Alternatively, the enabling STA can calculate an appropriate whitespace zone from locations of dependent STAs previously registered in the enabling STA and provided with the service from the enabling STA, or specific location information. The order of the whitespace zone and location may depend on the algorithm of deriving them.

Figure 5:
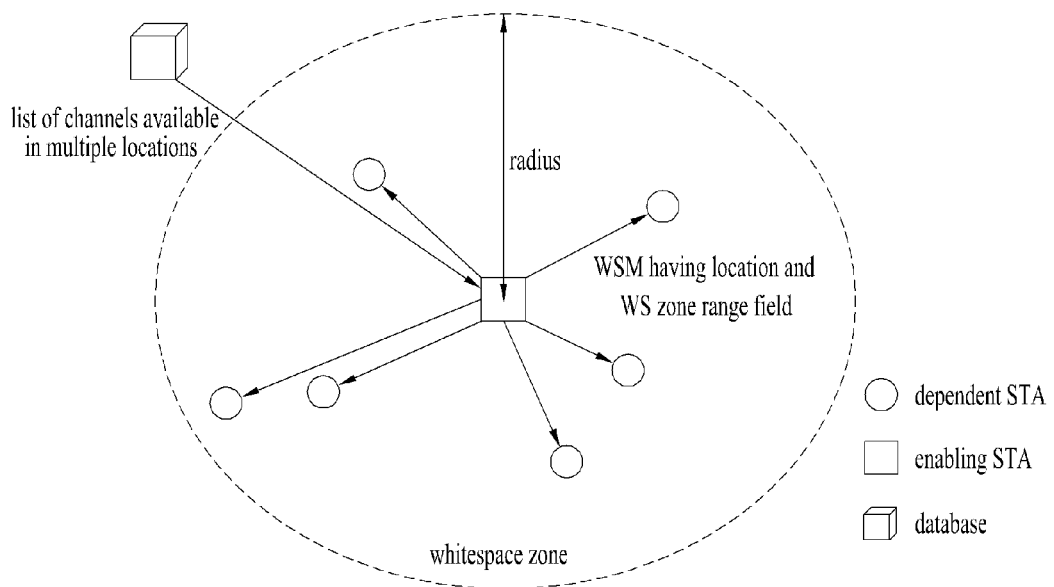
FIG. 5 illustrates a whitespace zone formed within a predetermined radius with a specific point as the center according to an exemplary embodiment of the present invention.

FIG. 5 illustrates a whitespace zone formed within a predetermined radius having a specific point as the center according to an exemplary embodiment of the present invention.

A boundary as shown in FIG. 5 can be set by a whitespace zone designated by an enabling STA. Locating in the whitespace zone means presence of the corresponding coordinate within the boundary of the whitespace zone. The enabling STA can acquire information on channels available in multiple locations from a database or a registered location server (RLS), calculate a channel commonly available in the whitespace zone, and signal the common available channel to dependent STAs located in the whitespace zone. The enabling STA can signal the common available channel through an enable signal and WSM, as described above.

A registered location field of the WSM corresponds to geo-location information of the enabling STA and a whitespace zone range of the WSM is represented in the form of a radius from the registered location or a location vector. A dependent STA that has received the WSM can calculate the whitespace zone indicated by a dotted line in FIG. 5 by combining the two fields of registered location field and whitespace zone range.

Figure 6:
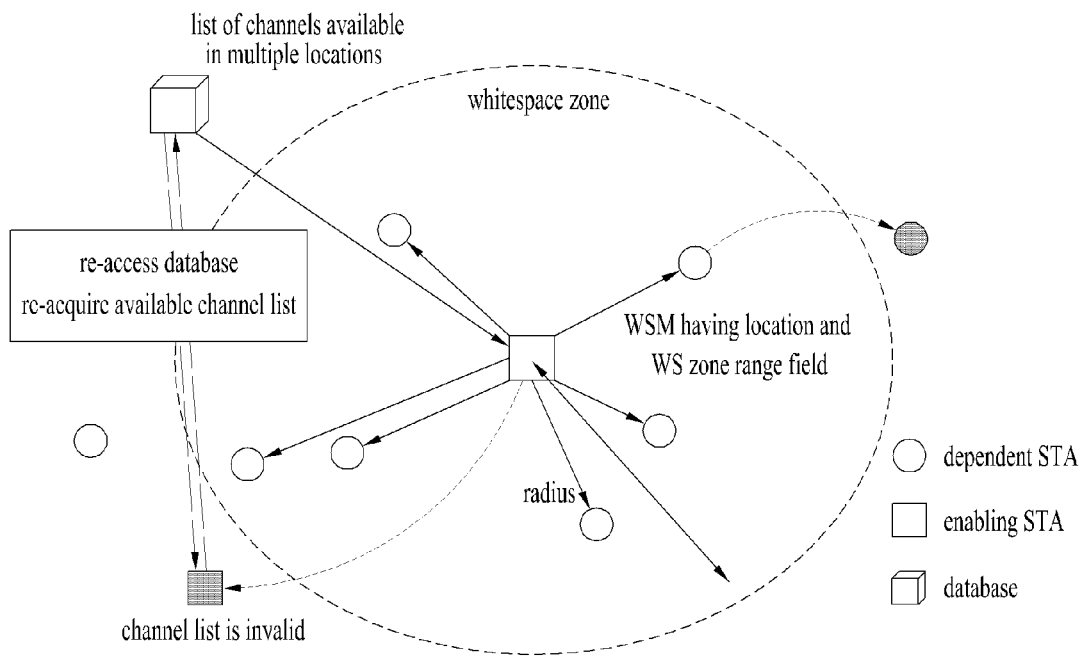
FIG. 6 is a view referred to for describing restrictions on the use of a WSM in the whitespace zone according to an exemplary embodiment of the present invention.

FIG. 6 is a view referred to for describing restrictions on the use of a WSM in a whitespace zone according to an embodiment of the present invention.

A dependent STA can operate using the same available channel while freely moving in the calculated whitespace zone. However, if the dependent STA moves out of the whitespace zone set by the enabling STA, channel map information acquired from the enabling STA is not valid any more. Accordingly, the channel map information needs to be updated for the dependent STA when the dependent STA moves out of the whitespace zone.

The channel map information is updated according to circumstances. In a case that the dependent STA can maintain its enabled state while continuously communicating with the enabling STA although it has moved out of the whitespace zone, the dependent STA can request a new WSM in order to acquire the WSM. If the enabling STA provides only the whitespace zone, the dependent STA is de-enabled when moving out of the whitespace zone, and newly enabled by another enabling STA.

A dependent STA can operate as illustrated in FIG. 6 without registering geo-location information thereof. However, a dependent STA that wants to operate as a master device, such as an AP (Access Point), needs to register geo-location information thereof in a location server or a database through the enabling STA.

A dependent STA is able to register location information thereof, to query channels available at the coordinate corresponding to the location information, to receive information on a list of channels available at the coordinate in the form of a WSM, and to use the channel list.

In this case, the registered location and whitespace zone range in the channel map shown in FIG. 2 can have null values. However, when the dependent STA moves by a predetermined distance (e.g., 100 m) or longer from the registered coordinate, the available channel list is not valid any more.

The dependent STA may want to set a whitespace zone and move in the whitespace zone while using the same channel. In this case, the dependent STA transmits a WSM request frame to the enabling STA.

Figure 7:
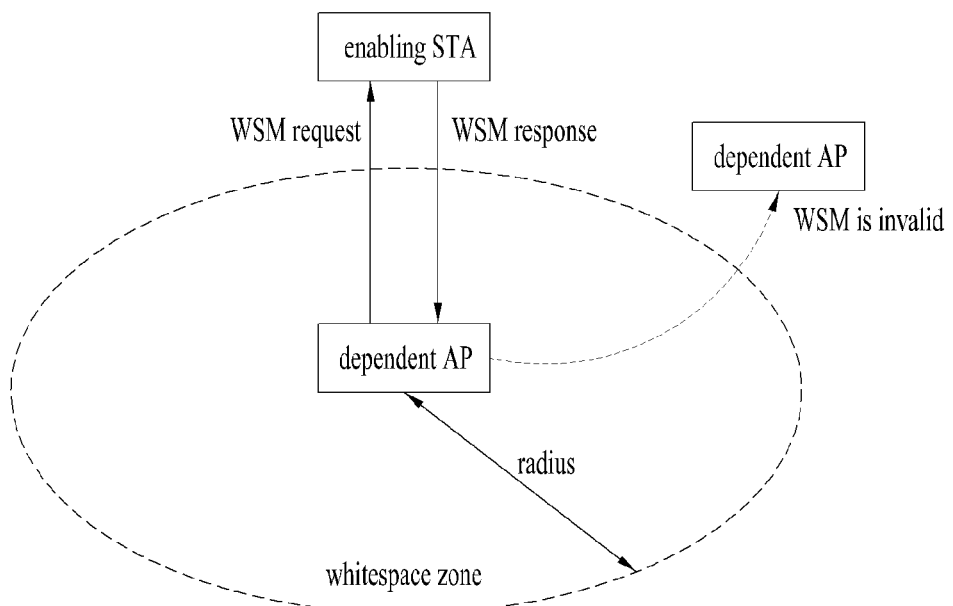
FIG. 7 is a view referred to for describing an operation of a dependent AP to request an enabling STA to provide WSM information according to an exemplary embodiment of the present invention.

FIG. 7 illustrates an operation of a dependent AP to request an enabling STA to provide WSM information according to an exemplary embodiment of the present invention.

Upon receipt of a WSM request frame, the enabling STA can transmit a WSM response frame including a channel map having the format as shown in FIG. 2 in response to the WSM request frame. Here, a registered location field of the WSM response frame corresponds to geo-location of the dependent AP (STA). A whitespace zone range of the WSM response frame may correspond to a radius from the registered location or a location vector indicating multiple locations.

While the registered location is assumed to be the location of the enabling STA in FIGS. 5 and 6, it is assumed that location information registered when the moving dependent STA requests the WSM is used as the registered location in FIG. 7.

The enabling STA can acquire information on channels available in multiple locations in the whitespace zone on the basis of registered geo-location information of the dependent STA and information on locations around the location of the dependent STA by requesting a database to provide the available channel information, and calculate a common available channel. This is achieved by performing an AND operation on sets of channels available in the multiple locations to calculate the intersection of the channel sets.

While no restriction is imposed on a method used for procedures of deriving optimized location information and available channel information required for the calculation, a common available channel, finally computed at a location selected from a whitespace zone range, needs to be applied to the method.

The dependent STA can operate using the same available channel while freely moving in the calculated whitespace zone. Accordingly, the dependent STA needs not newly acquire information about an available channel whenever the geo-location thereof is changed by a predetermined distance (e.g., 100 m) or more when the dependent STA operates while moving.

However, when the dependent STA moves out of the whitespace zone set by the enabling STA, channel map information acquired from the enabling STA is not valid any more. Accordingly, the WSM needs to be updated.

The WSM request frame may include registered location and radius information. In this case, the dependent STA sets the whitespace zone, and the enabling STA calculates the whitespace zone on the basis of the registered location and radius information upon receipt of the WSM request frame. The enabling STA can select appropriate or most suitable multiple locations included in the calculated whitespace zone and acquire information on channels available in the locations from a database (or registered location server). Similarly to the scenarios illustrated in FIGS. 5 and 6, the enabling STA can compute a common available channel from the acquired available channel information. The enabling STA can configure a channel map with the information on the common channel available in the calculated whitespace zone, include the channel map in a WSM of a WSM response frame, and transmit the WSM response frame to the dependent STA.

While the aforementioned embodiments of the present invention have described the scheme of setting a whitespace zone, which is operated using a common WSM, on the basis of a radius having a specific point designated by latitude and longitude as the center (first type) and the scheme of designating the whitespace zone based on a location vector indicating information on multiple locations, it is also possible to configure the whitespace zone using both the two types.

Figure 8:
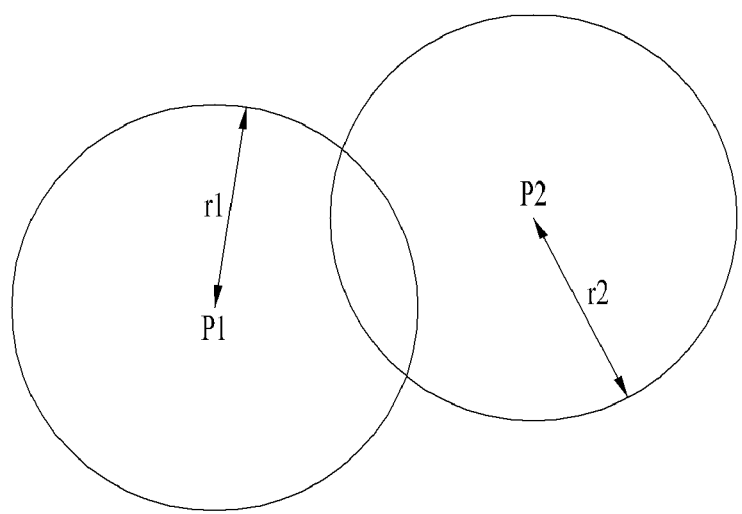
FIG. 8 is a view referred to for describing a scheme of defining a whitespace zone according to an exemplary embodiment of the present invention.

FIG. 8 is a view referred to for describing a scheme for designating a whitespace zone according to an embodiment of the present invention.

As described above, zone information for handling a WSM which is commonly applicable to multiple locations can be configured using specific point p1 designated based on latitude/longitude and radius r1 in a plane from the specific point p1, or using multiple points p1 and p2. Furthermore, these two schemes can be simultaneously applied in an exemplary embodiment of the present invention. For example, in FIG. 8, ranges within specific radiuses r1 and r2 from the points p1 and p2 can be used as location information for configuring a whitespace zone.

A description will be made of a method of acquiring available channel information based on multiple locations when an STA performs channel availability query (CAQ) in order to obtain an available channel list.

As described above, the STA must consider protection of an incumbent user to operate in a whitespace band. Accordingly, the STA needs to access a whitespace band database or a location server to register location information thereof and acquire a list of available channels. A procedure of acquiring an available channel list is called a CAQ procedure.

Figure 9:
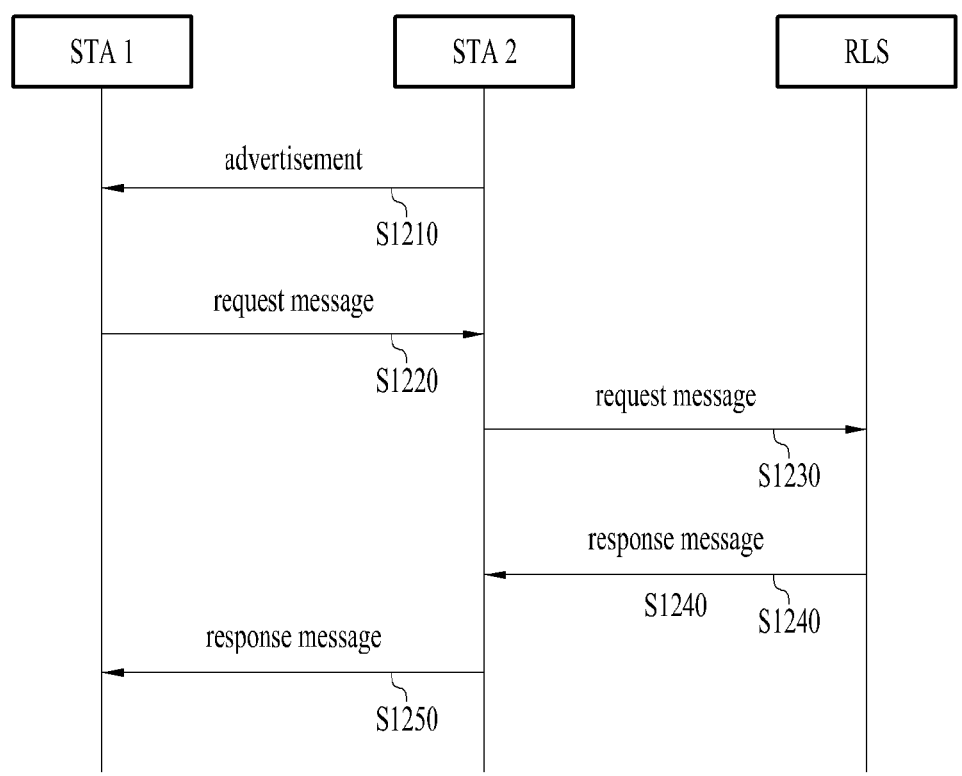
FIG. 9 illustrates a channel availability query procedure.

FIG. 9 illustrates an exemplary CAQ procedure.

A CAQ procedure employing a registered location query protocol (RLQP) uses a registered location secure server (RLSS) or an RLS in order to register an available channel list. Here, although the RLSS or RLS do not have to transmit/receive WLAN signals, the RLSS or RLS is a functional entity connected with an STA (e.g. STA 2 of FIG. 9) that advertises RLQP through a wired or wireless connection means. STA 2 may be regarded as the same entity as the RLSS or RLS.

Referring to FIG. 9, STA 1 can receive an advertisement protocol element indicating that STA 2 supports RLQP in step S1210. That is, STA 1 can receive a management frame having an advertisement protocol ID corresponding to RLQP from STA 2.

STA 1 that wants to operate in a whitespace band can transmit a CAQ request message as a CAQ requesting STA to STA 2 (S1220). FIG. 10 shows a channel availability query frame format according to an embodiment of the present invention.

Referring to FIG. 10, a CAQ action field can include a device class, device identity information, device location information, and a WSM. Particularly, the device location information field can be repeated according to the present embodiment. Accordingly, an STA can signal multiple locations in one frame by repeating device location information. In this case, it is necessary to indicate that the corresponding query relates to the multiple locations. An exemplary channel query information field format for indicating the query about the multiple locations is shown in FIG. 11.

FIG. 11 shows a channel query information field format according to an exemplary embodiment of the present invention. In the case of CAQ for multiple locations, a device location information present field is set to 1 so as to indicate presence of location information. A field indicating the quantity of device location information represents the number of locations relating to the corresponding query.

FIG. 12 shows exemplary device location information according to an embodiment of the present invention.

Referring to FIG. 12, device location information includes vicinity information in addition to latitude, longitude and altitude information. The vicinity information may be another expression of the radius described in the above embodiment. In addition, the device location information includes a vicinity present field that represents the presence of the vicinity information. 32 bits following the vicinity present field indicates vicinity information.

If the vicinity present field indicates 0 (off), the device location information indicates a query about the corresponding specific location point. For example, when vicinity corresponds to a radius, a whitespace zone with a radius of 1 Km can be designated for one point. However, it is also possible to set a whitespace zone based on a query about a plurality of point locations at a resolution distance (50 m) or less.

In an exemplary embodiment of the present invention, when there is a plurality of pieces of device location information, the device location information may not include vicinity information (or radius information). Because it can be considered that a zone corresponding to a resolution distance is set at each point when a plurality of points is designated, it is unnecessary to designate additional vicinity information (radius information).

FIG. 13 shows device location information regarding a personal/portable device. The device location information may not include an altitude value, as described above. In this case, vicinity information can be designated in a plane defined by latitude and longitude values. Table 1 shows exemplary device location information presented in TLV form.

TABLE 1

| Name | Type | Length | Value | Range |
|---|---|---|---|---|
| Device Location Information | <ANY> | 18 | The device location information contains the latitude, longitude, and altitude information of the device with the format using the first 128 bits of DSE registered location element in 8.4.2.54, in which the last 5 bits (B123? B127) remains reserved. It is set from the dot11STALCITable MIB object. When the device type subfield of the device class field (Table E-af2) is not set to fixed TVBD, B80-B119 of DSE registered location element in 8.4.2.54 is set to vicinity information. | AF_CAQ, US |

Referring back to FIG. 9, upon receipt of the CAQ request message, STA 2 can transmit the CAQ request message to the RLSS or RLS. When the database/RLS receives a query about multiple locations, the database/RLS calculates a channel commonly available in a whitespace zone determined based on combination of the multiple locations (corresponding to respective areas) and transmits a CAQ frame in response to the CAQ request message. The CAQ frame is transmitted to STA 1 via STA 2 (S1240 and S1250). If STA 2 corresponds to the RLSS or RLS, the RLSS or RLS responds to the query of STA 1 about the multiple locations (S1240 and S1250 are omitted).

As described above, when one or more channels commonly available in multiple locations are present, a WSM including information on the channels commonly available in the multiple locations can be received as a CAQ response message. According to an embodiment of the present invention, however, an available channel list corresponding to the first location of multiple locations is provided while a CAQ response message provides no information when one or more channels commonly available in the multiple locations are present. In this case, it is impossible to secure a list of channels commonly available in a whitespace zone to eliminate the necessity of updating WSM whenever an STA moves. However, available channel information corresponding to the current location of an STA that requests CAQ can be provided such that the STA can perform WLAN operation at the current location thereof first.

To discriminate a CAQ request and a CAQ response from each other, an embodiment of the present invention proposes a cause effect code as follows.

TABLE 2

| Reason result code | Description |
|---|---|
| 0 | Reserved |
| 1 | Channel Availability List requested |
| 2 | Reserved |
| 3 | Success with the available channel list result |
| 4 | Request declined |
| 5 | Request not successful because of device ID verification failure |
| 6 | Request not successful as one or more parameters have invalid values |
| 7 | Handshake timeout |
| 8 | Success with the available channel list result for WSZ |
| 9-255 | Reserved |

That is, in an embodiment of the present invention, when CAQ request is performed as illustrated in FIG. 9, it is possible to indicate that a corresponding frame corresponds to a CAQ request message using reason result code 1. Reason result code 8 indicates that a CAQ response message includes information on a channel commonly available in a zone formed based on multiple locations for the CAQ request. Reason result code 3 represents that a common available channel is not provided but available channel information corresponding to the first location of multiple locations is provided.

Figure 14:
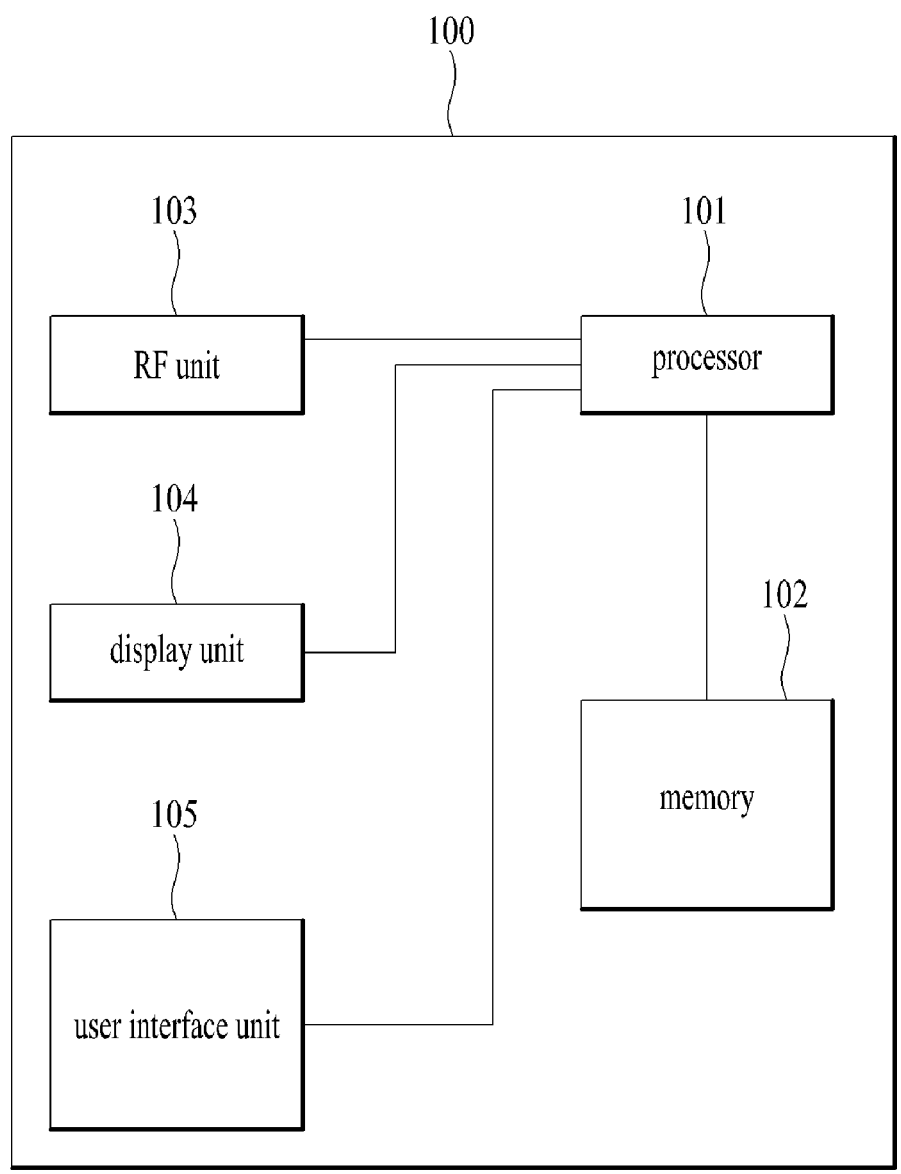
FIG. 14 is a block diagram illustrating a configuration of an STA capable of implementing the present invention.

FIG. 14 is a block diagram illustrating a configuration of an STA capable of implementing the present invention.

Referring to FIG. 14, an STA device 100 may include a processor 101, a memory 102, an RF (Radio Frequency) unit 103, a display unit 104, and a user interface unit 105. Functions of layers including a physical interface protocol layer can be executed by the processor 101.

The memory 102 is electrically connected to the processor 101 and stores an operating system, applications and general files.

If the STA device 100 is a user device, the display unit 104 can be implemented using known LCD (Liquid Crystal Display), OLED (Organic Light Emitting Diode), etc. and display various information. The user interface unit 105 can be configured in such a manner that it is combined with a known user interface such as keypad, touch-screen, etc.

The RF unit 103 is electrically/functionally connected to the processor 101 and transmits/receives RF signals. The RF unit 103 can include a transmission module and a reception module. The RF unit 103 may be referred to as a transceiver.

The transmission module can code and modulate signals and/or data that are scheduled by the processor 101 to be transmitted, and then deliver the signals and/or data to an antenna.

The reception module can decode and demodulate an RF signal received through the antenna to restore the RF signal to original data and transmit the original data to the processor 101.

The transceiver of the STA 100 can support a channel query procedure, transmit a first message including device location information of one or more locations for CAQ to a peer STA corresponding to a channel availability query responding STA of the channel query procedure, and receive a second message including channel availability information acquired from an RLS or RLSS from the peer STA.

The processor 101 can be configured to regard channel availability information to be commonly available in multiple locations in a specific zone when the device location information included in the first message corresponds to information on the multiple locations in the specific zone.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

Industrial Applicability

While the embodiments of the present invention have been described based on IEEE 802.11, the embodiments can be equally applied to various mobile communication systems in which an unlicensed device can perform channel availability query in a whitespace band.

What is claimed is:

1. A method for a station (STA) to perform a channel availability query procedure in a wireless communication system, the method comprising:
    transmitting, at a first STA corresponding to a channel availability query requesting STA, a first message to a second STA supporting the channel availability query process, the second STA corresponding to a channel availability query responding STA, the first message comprising device location information of one or more locations for the channel availability query; and
    receiving, at the first STA from the second STA, a second message comprising channel availability information,
    wherein, when the device location information of the first message is for multiple locations within an area and the second message indicates that the channel availability information is commonly applicable to the multiple locations, the channel availability information is commonly applicable to the multiple locations within the area, and
    wherein, when the device location information of the first message is for the multiple locations within the area and there is no channel availability information commonly applicable to the multiple locations, the channel availability information is applicable to a first location among the multiple locations.

2. The method according to claim 1, wherein the channel availability information is obtained from a registered location server.

3. The method according to claim 1, wherein the second STA comprises a registered location server.

4. The method according to claim 1, wherein:
    the device location information comprises geo-location position information comprising at least latitude, longitude, and radius information; and
    the radius information indicates a radius in a horizontal plane from a point designated by the latitude and longitude information.

5. The method according to claim 1, wherein the first message further comprises information indicating a number of the device location information.

6. The method according to claim 1, wherein:
    the device location information about the one or more locations is of one or both of first and second types;
    the first type is defined based on geographical point information comprising at least latitude, longitude, and radius information; and
    the second type is defined based on a plurality of device location information.

7. The method according to claim 1, wherein:
    the channel query process is performed by using a GAS protocol; and
    the first STA and the second STA employ a RLQP (Registered Location Query Protocol).

8. The method according to claim 7, wherein the first message further comprises:
    a reason result code indicating that the first message is for a channel availability query request; and
    a STA identity information for the addresses of the channel query requesting STA and the channel query responding STA.

9. The method according to claim 7, wherein:
    the second message further comprises a reason result code indicating a first value or a second value;
    the first value indicates that the channel availability information is commonly applicable to the multiple locations within the area; and
    the second value indicates that the channel availability information is for a first location among the multiple locations.

10. A station device operable as a first station (STA) of a channel query procedure in a wireless communication system, the station device comprising:
    a transceiver supporting the channel query procedure, and configured to:
        transmit a first message comprising device location information of one or more locations for the channel availability query to a second STA supporting the channel query procedure and corresponding to a channel availability responding STA of the channel query procedure; and
        receive a second message including channel availability information from the second STA; and
    a processor connected to the transceiver and configured to control the transceiver to operate the first STA as a channel availability query requesting STA of the channel query procedure,
    wherein, when the device location information of the first message is for multiple locations within an area and the second message indicates that the channel availability information is commonly applicable to the multiple locations, the channel availability information is commonly applicable to the multiple locations within the area, and
    wherein, when the device location information of the first message is for the multiple locations within the area and there is no channel availability information commonly applicable to the multiple locations, the channel availability information is applicable to the first location among the multiple locations.

11. A method for a station (STA) to perform a channel query procedure in a wireless communication system, the method comprising:
    receiving, from a first STA corresponding to a channel availability query requesting STA, a first message at a second STA supporting the channel availability query process, the second STA corresponding to a channel availability query responding STA, the first message comprising device location information of one or more locations for the channel availability query; and
    transmitting, to the first STA by the second STA, a second message comprising channel availability information,
    wherein, when the device location information of the first message is for multiple locations within an area and the second message indicates that the channel availability information is commonly applicable to the multiple locations, the channel availability information is commonly applicable to the multiple locations within the area, and
    wherein, when the device location information of the first message is for the multiple locations within an area and there is no channel availability information commonly applicable to the multiple locations, the channel availability information is applicable to a first location among the multiple locations.

12. A station device operable as a second station (STA) of a channel query procedure in a wireless communication system, the station device comprising:
 a transceiver configured to:
  receive a first message comprising device location information of one or more locations for a channel availability query from a first STA corresponding to a channel availability query requesting STA of the channel query procedure and
  transmit a second message comprising channel availability information to the first STA; and
 a processor connected to the transceiver, and configured to control the station device to support the channel query procedure and operate as a channel availability responding STA of the channel query procedure,
 wherein, when the device location information of the first message is for multiple locations within an area and the channel availability information is commonly applicable to multiple locations, the channel availability information is commonly applicable to the multiple locations within the area, and
 wherein, when the device location information of the first message is for the multiple locations within the area and there is no channel availability information commonly applicable to the multiple locations, the channel availability information is applicable to a first location among the multiple locations.

13. The method according to claim 1, wherein, when the device location information of the first message is for the multiple locations within the area and there is no channel availability information commonly applicable to the multiple locations, the channel availability information is applicable only to the first location among the multiple locations.

14. The method according to claim 1, wherein, when the device location information of the first message is for the multiple locations within the area and there is no channel availability information applicable to any of the multiple locations, the second message indicates that the second STA refuses to provide the channel availability information.

* * * * *